(12) United States Patent
Lee

(10) Patent No.: US 6,450,349 B2
(45) Date of Patent: Sep. 17, 2002

(54) REFRIGERATOR STORAGE APPARATUS

(76) Inventor: Anthony J. Lee, 589 N. Church St., Hazelton, PA (US) 18201

( * ) Notice: Subject to any disclaimer, the term of this patent is extended or adjusted under 35 U.S.C. 154(b) by 0 days.

(21) Appl. No.: 09/875,393

(22) Filed: Jun. 6, 2001

Related U.S. Application Data

(63) Continuation-in-part of application No. 09/588,766, filed on Jun. 7, 2000, now abandoned.

(51) Int. Cl.⁷ .................................................. A47F 7/00
(52) U.S. Cl. ........................ 211/85.18; 211/74; 211/75; 211/175; 211/94.01
(58) Field of Search ............................ 211/74, 75, 59.2, 211/162, 94.01, 85.18, 175; 312/36, 72, 73

(56) References Cited

U.S. PATENT DOCUMENTS

| | | | |
|---|---|---|---|
| 2,029,109 A | * | 1/1936 | Kucher |
| 2,029,263 A | | 1/1936 | Keighley ................... 62/126 |
| 2,581,363 A | | 1/1952 | Creedon ..................... 211/152 |
| 2,678,735 A | | 5/1954 | Creedon ..................... 211/74 |
| 3,501,016 A | | 3/1970 | Eaton ......................... 211/49 |
| 3,887,102 A | * | 6/1975 | Earley |
| 4,036,369 A | * | 7/1977 | Eisenberg |
| 4,478,337 A | * | 10/1984 | Flum ........................ 211/59.2 |
| 4,550,910 A | * | 11/1985 | Goldfarb et al. |
| 5,024,336 A | * | 6/1991 | Spamer ..................... 211/59.2 |
| 5,542,552 A | * | 8/1996 | Yablans et al. |
| 5,560,500 A | * | 10/1996 | Wilcox |
| 5,564,962 A | * | 10/1996 | Navarrete Espinosa |
| 5,819,937 A | | 10/1998 | Walker ....................... 206/429 |
| 5,878,862 A | * | 3/1999 | Dewsnap ............... 211/59.2 X |

* cited by examiner

*Primary Examiner*—Robert W. Gibson, Jr.

(57) ABSTRACT

A refrigerator storage guide channel for storing and aiding in the convenient retrieval of cooled containers includes a left and right channel member. The left and right channel members include a base, sidewalls and a feature for adjustably interlocking the channel members. The channel members are slidably joined via the interlocking feature. The base of the channel members preferably include features for reducing friction.

18 Claims, 17 Drawing Sheets

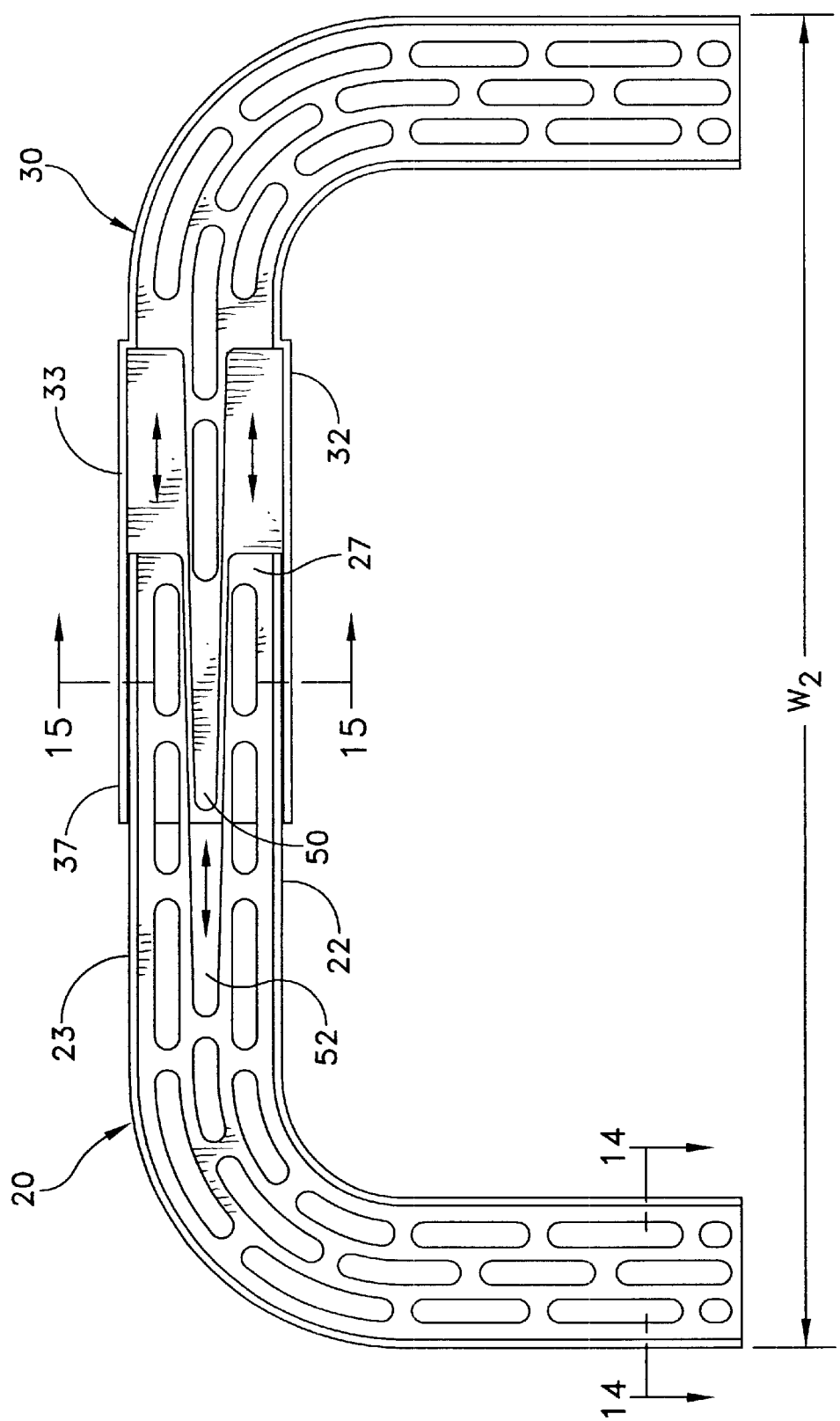

REFRIGERATOR STORAGE APPARATUS

CROSS REFERENCE TO RELATED APPLICATIONS

This application is a continuation in part of U.S. application Ser. No. 09/588,766 filed Jun. 7, 2000, now abandoned.

This invention claims priority of patent application Ser. No. 09/588,766.

FIELD OF THE INVENTION

The invention generally relates to a refrigerator apparatus for storage of refrigerator contents, and more particularly to a two piece adaptable channel track which can be adjusted to fit various sizes of refrigerators and is convenient for storage of cans, bottles and the like.

BACKGROUND OF THE INVENTION

The present invention was conceived as an answer to the task of cooling and storing drinks in a household refrigerator. Problems are often encountered in that leftovers from meals often occupy most of the extra space in a refrigerator. Beverages such as soda in individual cans, individual bottles of water, and other beverages, which are continuously being used and replenished, often have their space taken up with something else by the time someone thinks to replace them. When drinks are being replaced it is most commonly desirable to place them so that any cold drinks remaining in the refrigerator are removed while warm ones are placed towards the rear of the shelf. The cold drinks are then repositioned in front so that a person reaching for a cold drink does not have to search, or reach over the warm ones.

In addition, cans or bottles placed on a refrigerator shelf made of wire or of aluminum or steel but having slots running from front to back or side to side, have a tendency to become stuck or even tip over if an attempt is made to slide them in order to make room for something else. This is often the case since the contents of most household refrigerators are constantly changing.

Another inconvenient characteristic of most refrigerators is that the depth of the shelves makes it difficult to reach to the very back of a shelf. This is especially inconvenient in the instance of a physically challenged person, for instance, one who must reach in while seated in a wheelchair.

This invention will ease the aforementioned inconveniences by storing containers, such as for beverages, which are in cans or bottles, utilizing the space which is otherwise least accessible in the refrigerator. When used as recommended, which is, for example, to retrieve drinks from one end and replace drinks at the opposite end, the colder drinks are continuously and automatically rotated to the retrieval end. Therefore, any need to manually shift items on a shelf, either to "make room" for, or to rotate warm drinks is eliminated. Drinks are substantially easier to retrieve and re-load since there is no need to reach any further than the front of the refrigerator. Further, wire racks in a refrigerator cannot interfere with the loading, unloading, or re-positioning of drinks with this invention, as the cans or bottles do not come into contact with the surface of the shelf. Still another benefit of this invention is the ability to adjust the storage apparatus to fit various size refrigerators.

Several refrigerator devices for storage of containers are currently known in the art. Examples are disclosed in U.S. Pat. Nos. 2,029,263—Keighley; U.S. Pat. No. 2,581,363—Creedon; U.S. Pat. No. 2,678,735—Creedon; U.S. Pat. No. 3,501,016—Eaton; and U.S. Pat. No. 5,819,937—Walker. These patents teach various apparatus for holding or storing refrigerator contents, and are hereby incorporated.

U.S. Pat. No. 2,029,263 to Keighley discloses a cooling unit for a refrigerator which includes a corrugated sheet metal portion which is secured to a flat sheet metal portion, both portions together forming a substantially U-shaped structure after being secured together. The corrugations are arranged to provide a refrigerant expansion or evaporating passage between the metal portions. The metal portions of the cooling unit serve as a refrigerating surface for cooling and causing circulation of air within the food storage compartment. A partition is disposed with the U-shaped structure which divides the space between legs of the U-shaped structure into a plurality of chambers. A plate is secured to the U-shaped refrigerated surface and to the partition to provide a support or track upon which a plurality of bottled beverages may be guided through the cooling unit.

U.S. Pat. Nos. 2,581,363 and 2,678,725 to Creedon disclose a refrigerator shelf with guide tracks, wherein objects such as bottles or cans can be circulated along a curved path consisting of two substantially parallel channels joined by a returning channel. The shelf comprises a horizontal base which supports vertical guiding walls. The base consists of longitudinal bars and cross bars which cross each other. The longitudinal bars form a guideway on which bottles and the like may move. The shelf further comprises a guiding cage wall consisting of longitudinal bars which form lateral guide rails along which bottles and the like may advance without much friction.

U.S. Pat. No. 3,501,016 to Eaton discloses a storage rack for articles in which the articles are received for storage at the front of a first channel and are delivered in series to the end of a second parallel channel, adjacent the point at which the articles are received, by the action of inserting the articles to be stored. The rack includes a pair of closely adjacent article receiving channels and guide means defining a turnaround path. The guide means comprise a resiliently deflectable surface for urging the articles in a direction from one channel to the other channel.

U.S. Pat. No. 5,819,937 to Walker discloses a refrigerator organizer for storing baby bottles. The organizer comprises a tray-like means having a U-shaped track defined between inner and outer partitions for receiving and movably storing a plurality of bottles or containers. The U-shaped channel is open-ended so that bottles may be introduced through one end of the channel and removed from the other end of the channel. Friction means, such as ridges or dimples, may be placed on the track for yieldably restricting the movement of the bottles within the channel.

The above storage devices are relatively complex and lack the ability to be adjusted to fit various sized refrigerators.

SUMMARY OF THE INVENTION

The present invention is refrigerator apparatus for storage and convenient retrieval of containers such as can and bottles and the like. The storage apparatus comprises a guide channel having a left and right channel member. Both channel member include a base, sidewalls, and interlocking means. The interlocking means are located in an interlocking region and the channel members are joined by the interlocking means. The guide channel may also include friction reducing means.

According to one embodiment of the invention, the interlocking means includes a tongue on one of the channel members and a tongue-shaped slot on the other channel member.

According to another embodiment of the invention, the interlocking means includes finger-like projections and recesses on each of the channel members.

According to another aspect of the invention, the storage apparatus comprises two or more guide channels having a left and right channel member.

BRIEF DESCRIPTION OF THE DRAWINGS

FIG. 13 is a top view showing assembly of the channel members of one embodiment of the invention.

DETAILED DESCRIPTION OF THE PREFERRED EMBODIMENT

Figure 1:
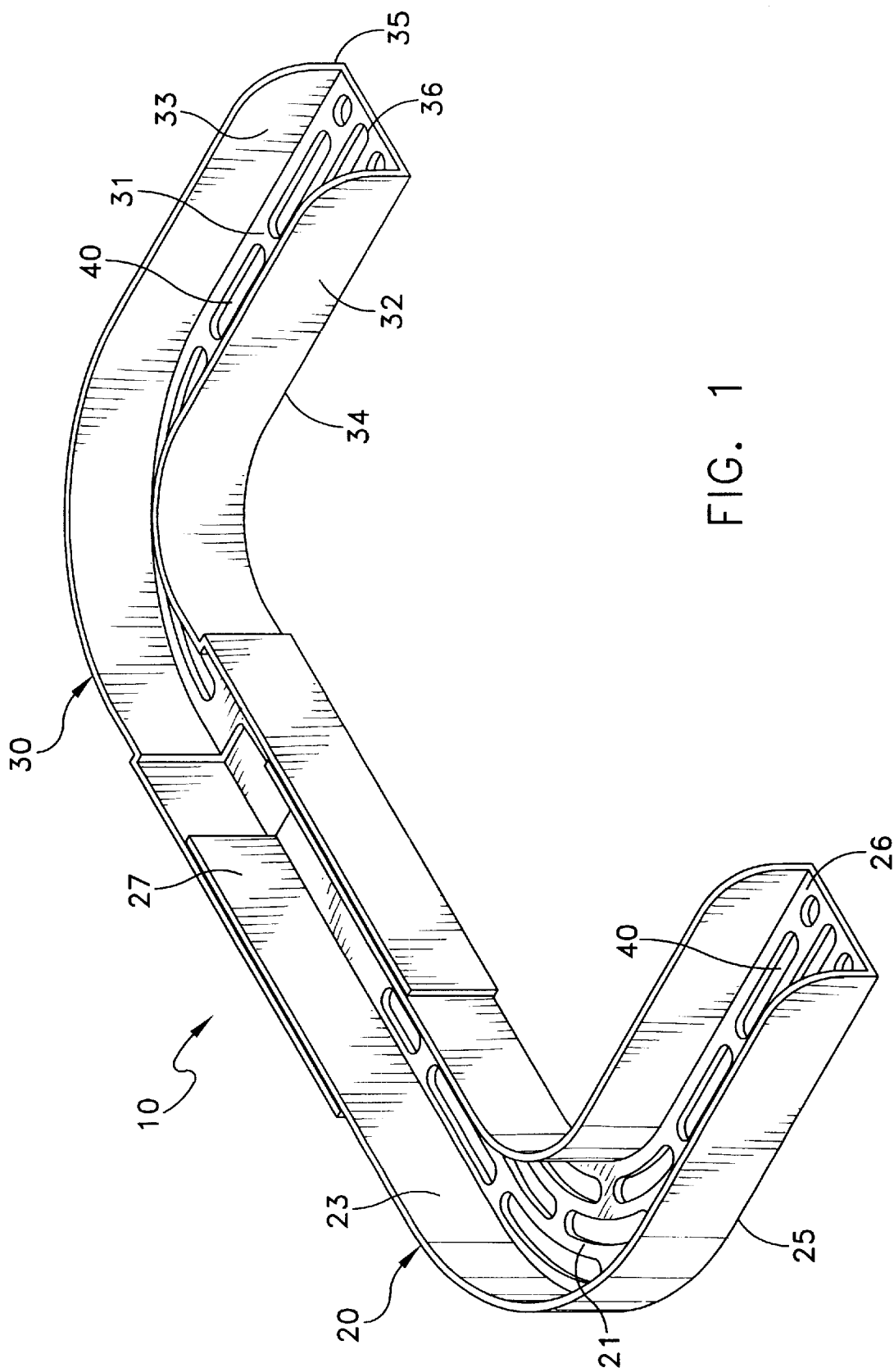
FIG. 1 is a perspective view of a refrigerator storage guide channel in accordance with one embodiment of the present invention.

Referring to FIG. 1, a refrigerator storage guide channel 10 comprises a left channel member 20 and a right channel member 30. The channel members each comprise a base, side walls and interlocking means. The interlocking means are located in an interlocking region and join the channel members. Generally, the interlocking means on one the channel members includes as least one elongated tab and the interlocking means on the other of the channel members is the base of that channel member in the interlocking region defining at least one elongated recess for slidably receiving the tab on the other of the channel members.

The guide channel may be comprised of a variety of materials, but is preferably made of a hard plastic material. The guide channel may be formed by molding or by other techniques known to those skilled in the art.

Figure 2:
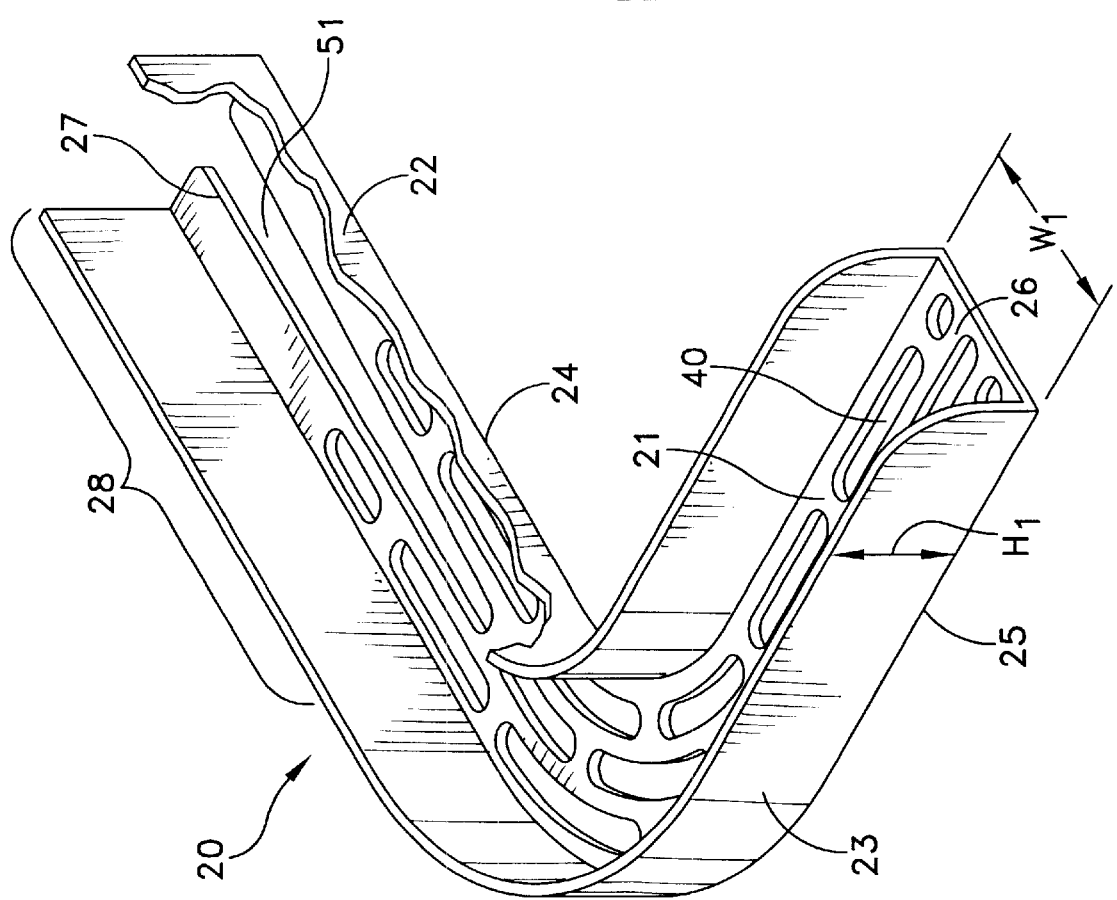
FIG. 2 is a perspective view of the left channel member.

Referring to FIGS. 1–2, left channel member 20 comprises a base 21, an inner sidewall 22 and an outer sidewall 23. Left channel member 20 has an inner edge 24, an outer edge 25, a front end 26, and a back end 27. Left channel member 20 includes a left channel interlocking region 28. The interlocking region 28 includes interlocking means.

Figure 3:
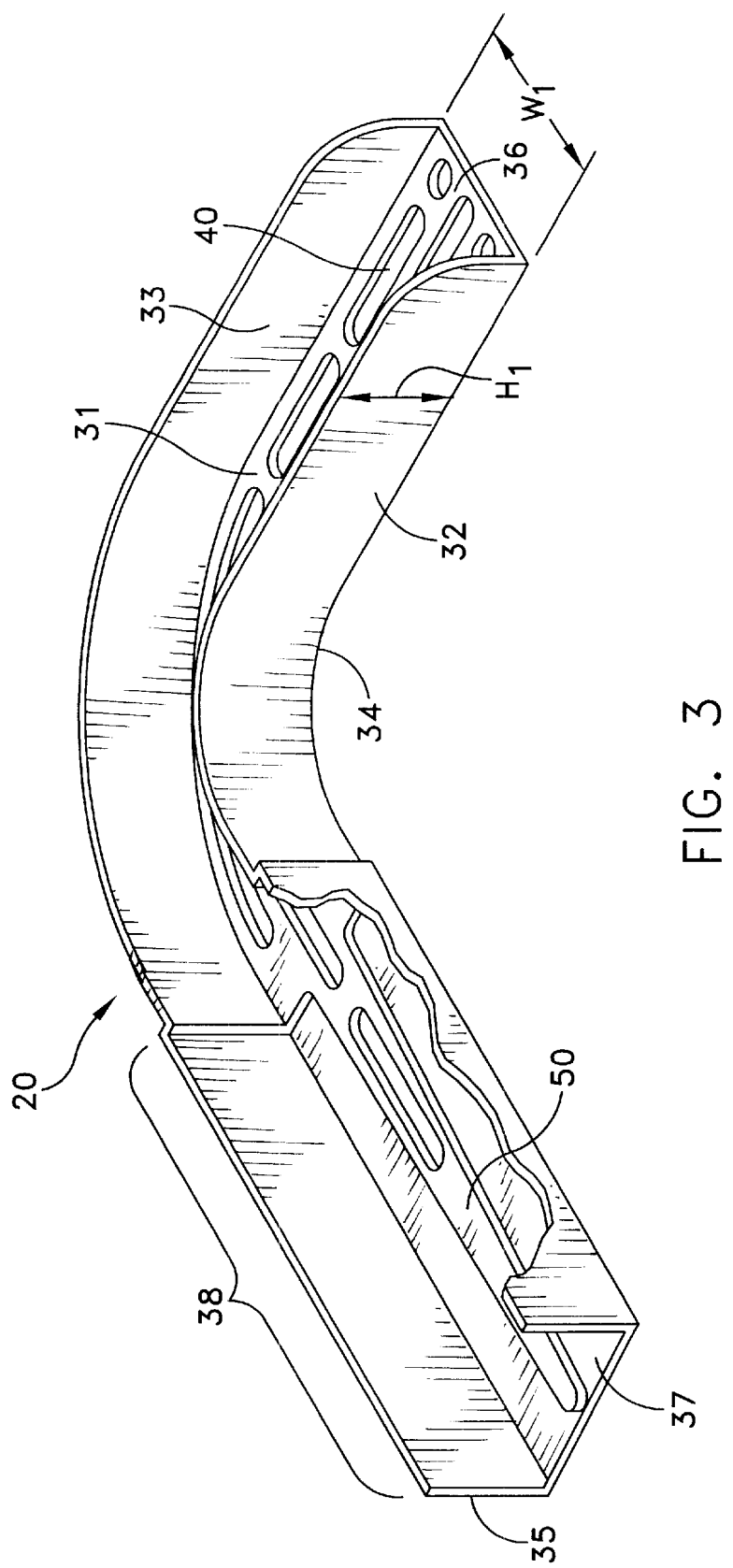
FIG. 3 is a perspective view of the right channel member.

Referring to FIG. 1 and 3, right channel member 30 comprises a base 31, an inner sidewall 32, and an outer sidewall 33. Right channel member 30 has an inner edge 34, and outer edge 35, a front end 36, and a back end 37. Right channel member 30 includes a right channel interlocking region 38. The interlocking region 38 includes interlocking means.

Figure 4:
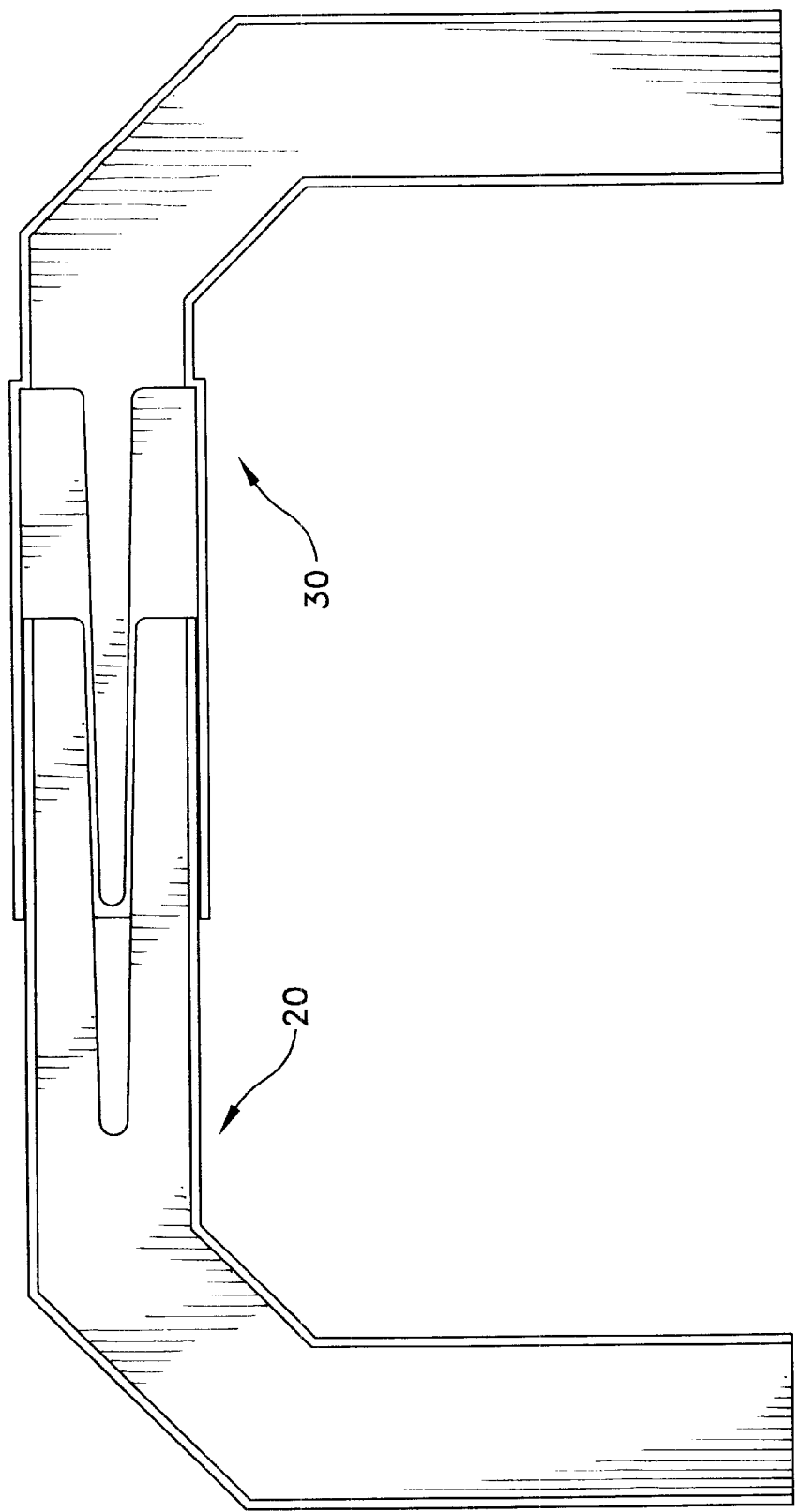
FIG. 4 is a top view of an embodiment of the present invention showing an alternative channel member shape.

Left and right channel members 20, 30 are substantially L-shaped. The corner on the "L" is preferably curved but may be angled as shown in FIG. 4. The width W1 of the bases 21, 31 may vary as desired and depending on the size of the containers or other items to be stored. Preferably the width W1 is approximately 2¾inches so that the channel members conveniently store standard sized beverages in cans or bottles.

The sidewalls 22, 23, 32, 33 of the channel members 20, 30 run along the inner and outer edges 24, 25, 34, 35 of the base 21 or 31 of their respective channel member and upwardly perpendicular to such base. The height H1 of the sidewalls 22, 23, 32, 33 of the channel members 20, 30 may be varied as desired and depending on the size of the containers or other items to be stored. Preferably the height H1 of the sidewalls is approximately 2 inches at the highest point to securely restrain standard-sized beverages in cans or bottles from tipping while being pushed along the bases 21, 31 and still allowing easy retrieval from any point along the channel members 20, 30. The sidewalls 22, 23, 32, 33 of the channel members 20, 30 are preferably sloped at the front ends 26, 36 of the channel members 20, 30 so as to minimize any obstacle to loading or retrieving containers being stored.

The bases 21, 31 of the channel members 20, 30 preferably further include friction reducing means. FIGS. 1–3 show one type of friction reducing means which may be employed. Such friction reducing means includes multiple elongated open slots 40 which run along the length and breadth of the bases 21, 31 of the channel members 20, 30 and parallel to the edges 24, 25, 34, 35 of the channel members 20, 30.

Figure 6:
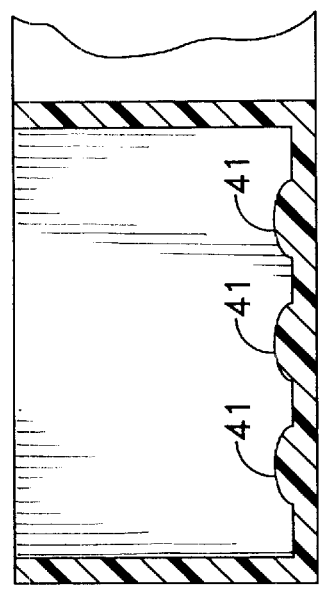
FIG. 6 is cross-sectional view along line 6—6 of FIG. 5.
Figure 5:
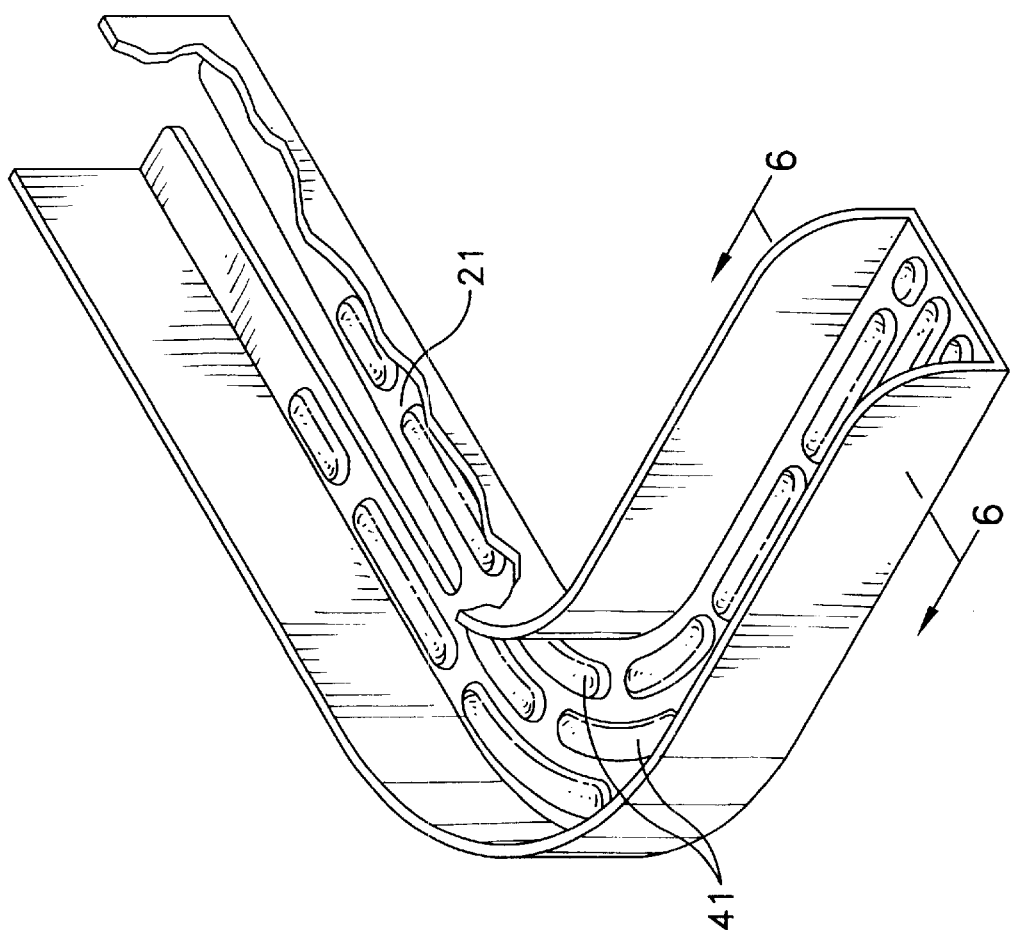
FIG. 5 is a perspective view showing one type of friction reducing means.
Figure 8:
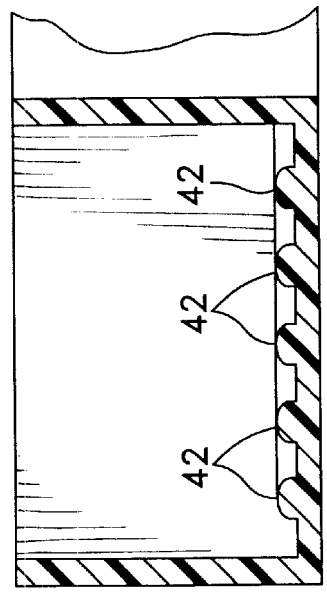
FIG. 8 is a cross-sectional view along line 8—8 of FIG. 7.
Figure 7:
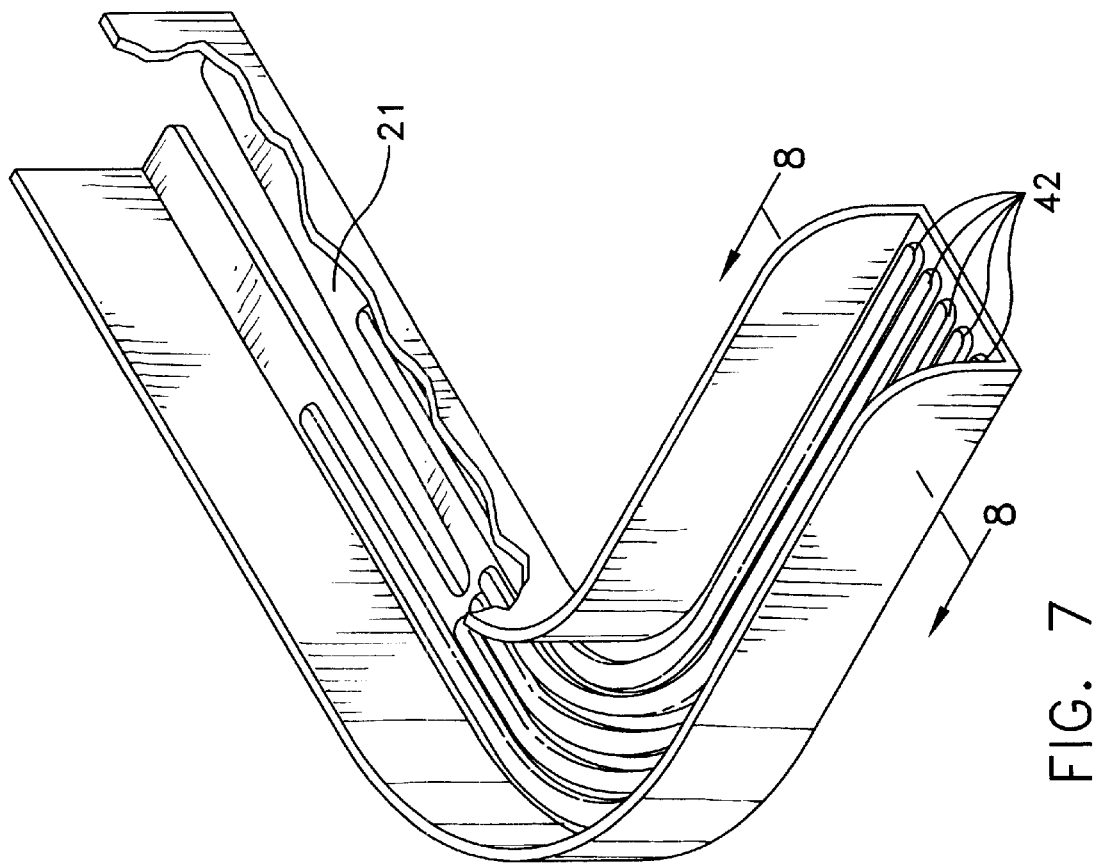
FIG. 7 is a perspective view showing an alternative friction reducing means.

FIGS. 5–6 show an alternative friction reducing means, wherein bases 21, 31 (right channel member not shown) include multiple elongated bumps 41 which run along the length and breadth of the bases 21, 31 of the channel members 20, 30 and parallel to the edges 24, 25, 34, 35 of the channel members 20, 30. FIGS. 7–8 show another alternative friction reducing means, wherein bases 21, 31 (right channel member not shown) include multiple continuous raised ridges 42 which run along the length and breadth of bases 21, 31 of the channel members 20, 30 and parallel to the edges 24, 25, 34, 35 of the channel members 20, 30. It should be understood that other types of friction reducing means are possible and known to those of ordinary skill in the art, and are covered by the present invention. Employment of these various friction reducing means reduce the friction caused by containers such as cans or bottles which are being pushed or slid on the top surface of bases 21, 31.

In one exemplary embodiment, as shown in FIGS. 1–4, the interlocking means on the right channel member 30 includes a long angular tongue-shaped section ("tongue") 50. As shown in FIG. 3, the base 31 of the right channel member 30 on either side of the tongue 50 in the interlocking region 38 is recessed relative to the tongue and the base 31 along the remainder of the right channel member 30. The base 31 of the right channel member 30 in the interlocking region 38 is widened along the length of the tongue 50 causing the sidewalls 32, 33 of the interlocking region 38 to be spaced slightly farther apart than the sidewalls 32, 33 of the remainder of the right channel member 30. In this exemplary embodiment, the interlocking means on the left channel member 20 includes an open tongue-shaped recess or slot 51 located on the base 21 of the left channel member 20 in the interlocking region 28. The tongueshaped slot 51 has substantially the same shape and size as the elongated tongue 50 of the right channel member 30. Once joined, the base 21 of the left channel member 20 in the interlocking region 28 fits on the top of the recessed base 31 of the right channel member 30 such that the top surface of bases 21, 31 of the channel members 20, 30 form a continuous plane.

Figure 9:
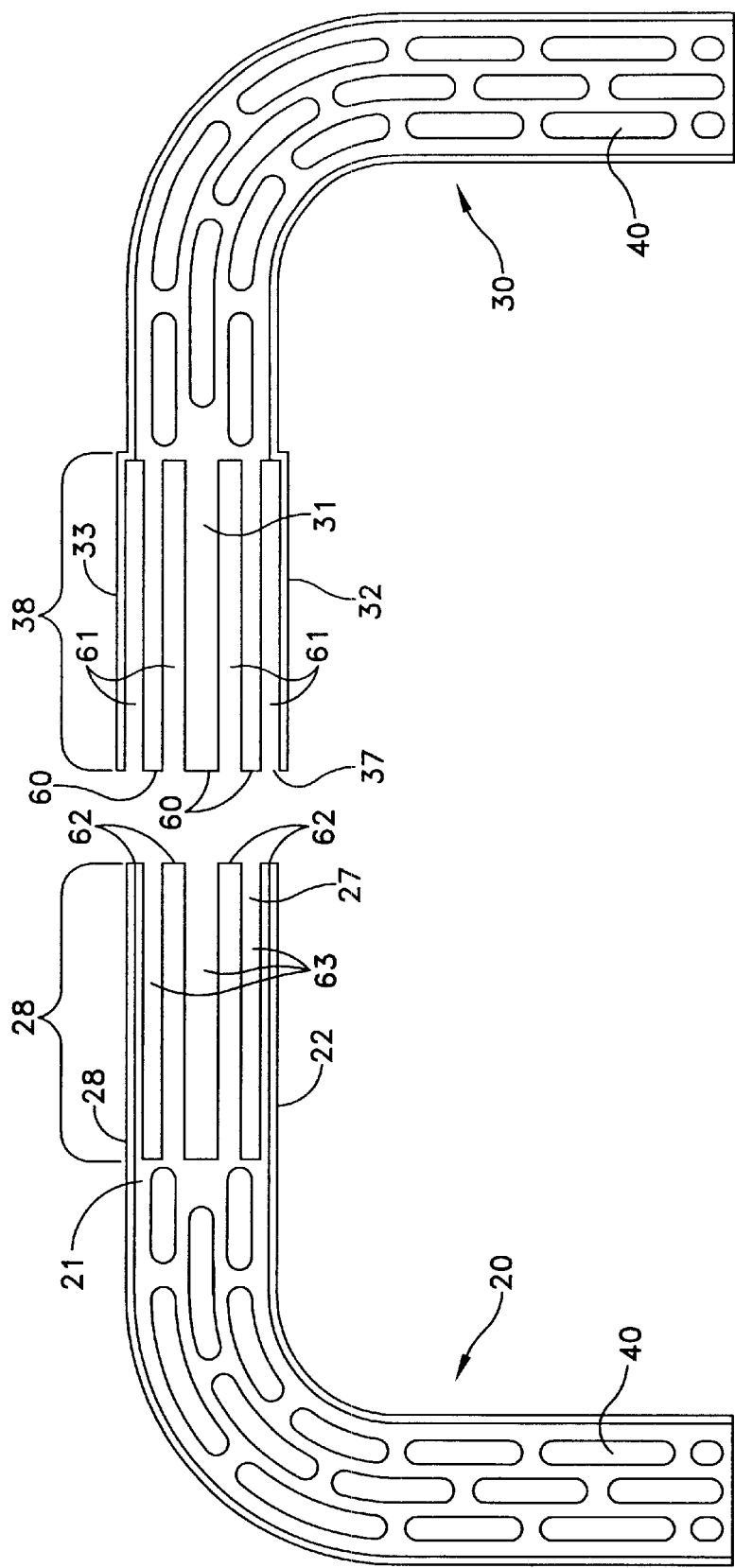
FIGS. 9–10 are top views of an alternative embodiment of the present invention.
Figure 10:
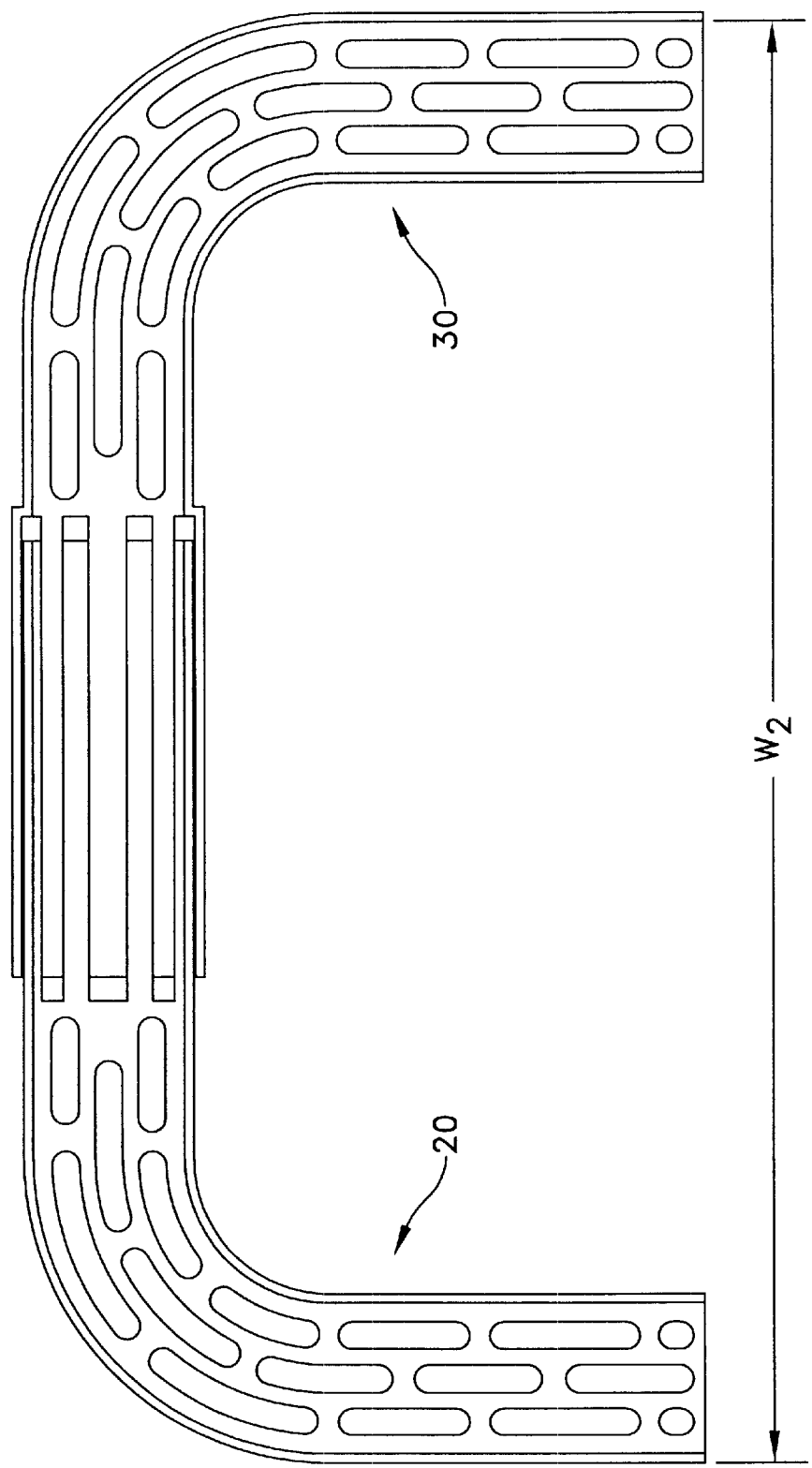

In another exemplary embodiment as shown in FIGS. 9–10, the interlocking means on the right channel member 30 includes a plurality of fingers 60 which make up the base 31 of the right channel member 30 in the interlocking region 38 and a plurality of recesses 61 which run the length of the fingers 60. The base 31 of the right channel member 30 in the interlocking region 38 is widened along the length of the fingers 60 causing the sidewalls 32, 33 of the interlocking region 38 to be spaced slightly farther apart than the sidewalls 32, 33 of the remainder of the right channel member 30. In this exemplary embodiment, the interlocking means on the left channel member 20 includes a plurality of fingers 62 which make up the base 21 of the left channel member 20 in the interlocking region 28 and a plurality of recesses 63 which run the length of the fingers 62.

Figure 11:
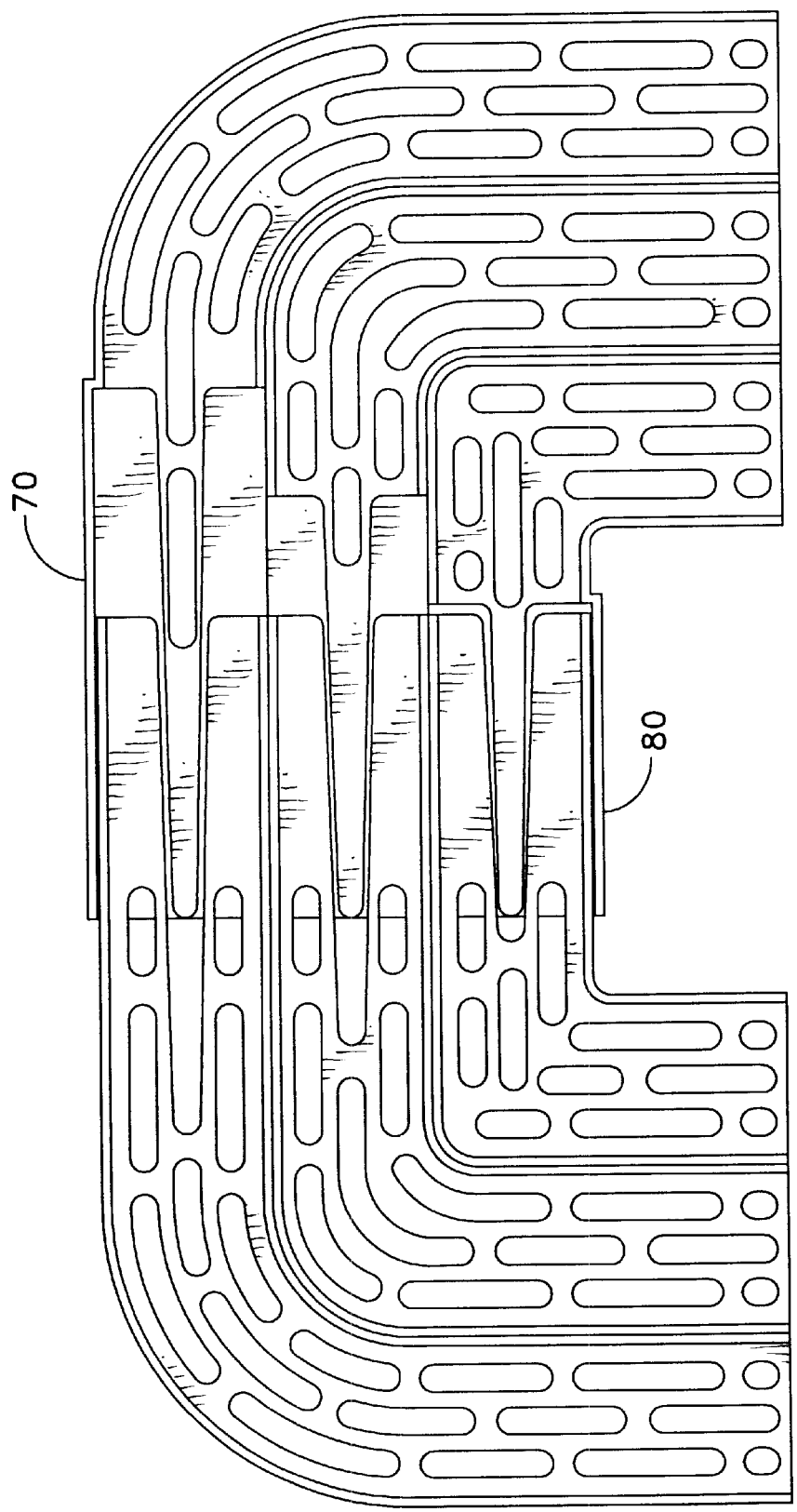
FIG. 11 is a top view of an alternative embodiment of the present invention.
Figure 12:
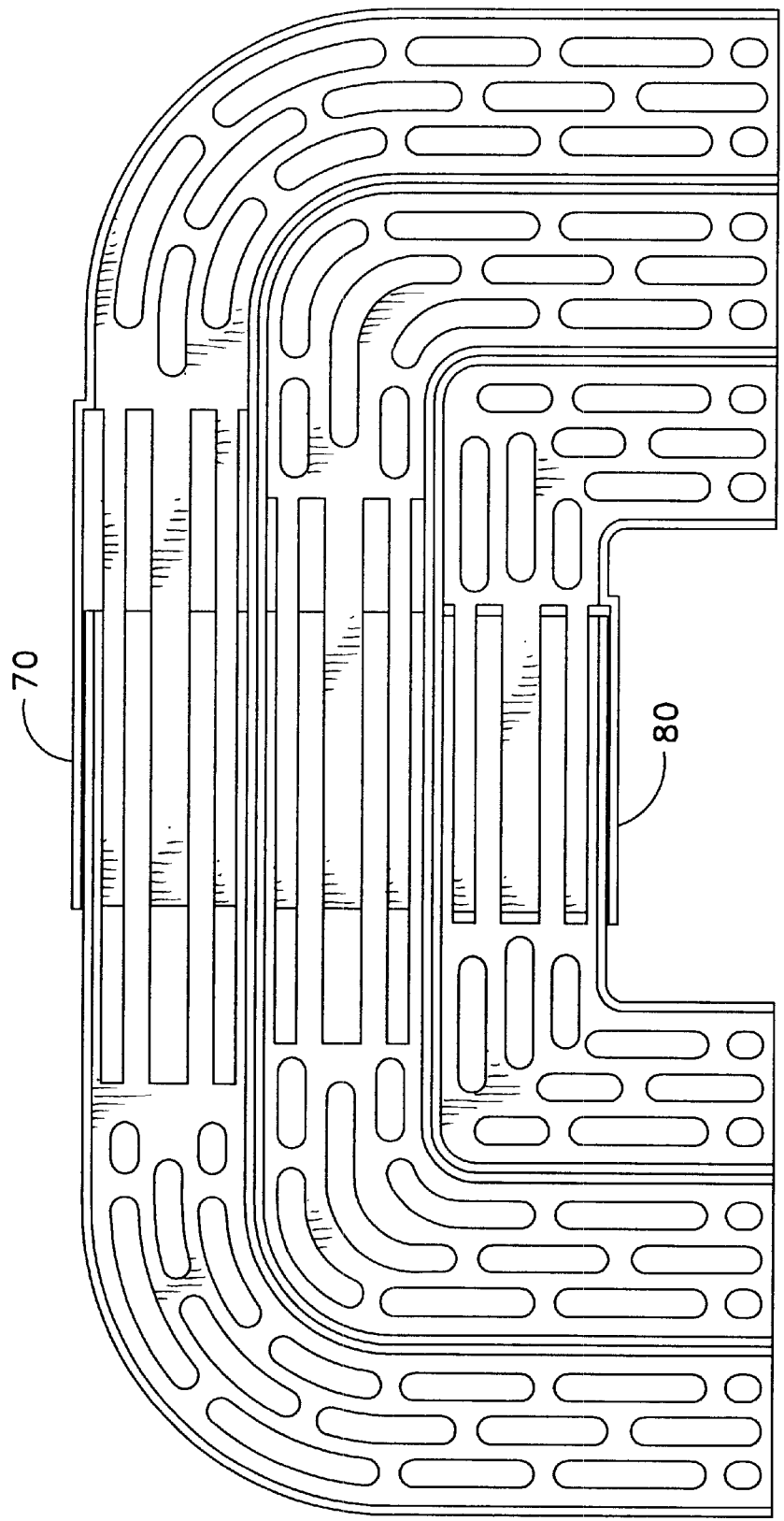
FIG. 12 is a top view of an alternative embodiment of the present invention.
Figure 15:
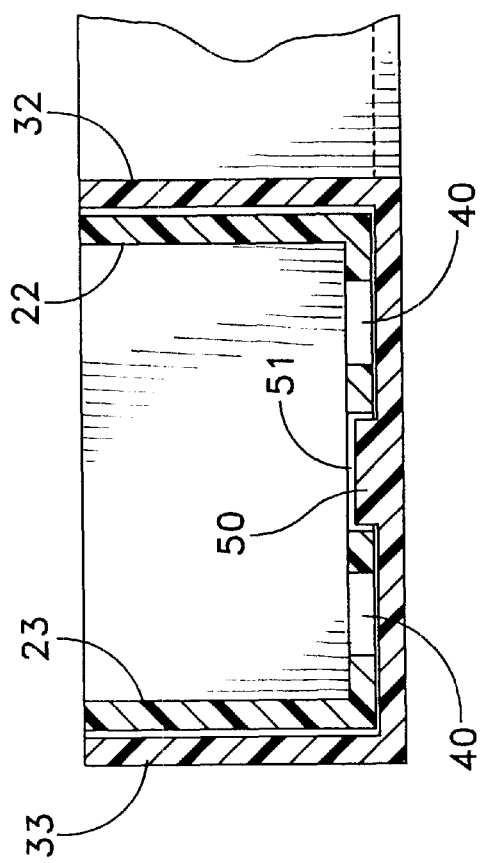
FIG. 14–15 are cross-sectional views of lines 14 and 15, respectively, of FIG. 13.
Figure 14:
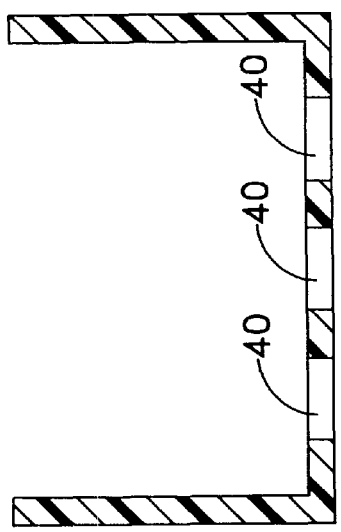

FIGS. 11 and 12 each show an additional alternative embodiment of the invention wherein the storage apparatus includes a plurality of guide channels, each guide channel having left and right channel members. The multiple left and right channel members of the embodiment in FIG. 11 each have a base, side walls, and interlocking means in an interlocking region. The interlocking means on the right channel members include a tongue and the interlocking means on the left channel members include a tongue-shaped recess or slot. The sidewalls of the interlocking region of the right channel member on the outermost edge 70 and innermost edge 80 of the storage apparatus are slightly widened to allow insertion of the sidewalls of the innermost and outermost right channel members. The inner sidewall of the outermost right channel member, the outer sidewall of the innermost right channel member, and the inner and outer sidewalls of any interior right channel members end at the beginning of the right channel member interlocking regions.

The multiple left and right channel members of the embodiment in FIG. 12 each have a base, side walls, and interlocking means in an interlocking region. The interlocking means on the right and left channel members include a plurality of fingers which make up the bases in the interlocking region and a plurality of recesses which run the length of the fingers. The sidewalls of the interlocking region of the right channel member on the outermost edge 70 and innermost edge 80 of the storage apparatus are slightly widened to allow insertion of the sidewalls of the innermost and outermost right channel members. The inner sidewall of the outermost right channel member, the outer sidewall of the innermost right channel member, and the inner and outer sidewalls of any interior right channel members end at the beginning of the right channel member interlocking regions.

The storage apparatuses as shown in FIGS. 11 and 12 comprise guide channels of decreasing width. The left channel members may be permanently attached to one another and the right channel members may be permanently attached to one another (such as by molding or other processes known to those skilled in the art) or alternatively, the left channel members may be detachably connected to each other and the right channel members may be detachably connected to each other. The latter alternative would allow a user to select the number of guide channels that he or she desired according to his or her needs. Although the embodiments shown in FIGS. 11 and 12 show storage apparatuses having three guide channels, alternative embodiment of the invention may have two, four or more guide channels.

According to certain inventive aspects, the two channel members of the guide channel are assembled in the following manner. In the exemplary embodiment as shown in FIGS. 1–3 and 13–15, the left channel member 20 and the right channel member 30 are joined at their respective back ends 27, 37. The back end 27 of the left channel member 20 is placed into the back end 37 of the right channel member 30 such that the sidewalls 22, 23 of the left channel member 20 fit inside of the sidewalls 32, 33 of the right channel member 30 and the tongue 50 of the right channel member 30 slides into the slot 51 of the left channel member 20. The base 21 of the left channel member 20 in the interlocking region 28 fits on top of the base 31 of the right channel member 30 which is slightly recessed in the interlocking region 38. When completely slid together, the two channel members 20, 30 form a continuous channel or track, the tongue 50 of the right channel member 30 fitting into the slot 51 of the left channel member 20 to maintain a substantially flat plane on which cans or bottles can slide without obstruction. The channel members 20, 30 can slide along one another, making the width W2 of the guide channel adjustable in order to accommodate different size refrigerator shelves.

In the exemplary embodiment as shown in FIGS. 9–10, the left channel member 20 and the right channel member 30 are joined at their respective back ends 27, 37. The back end 27 of the left channel member 20 is placed into the back end 37 of the right channel member 30 such that the sidewalls 22, 23 of the interlocking region 28 of the left channel member 20 fit inside of the sidewalls 32, 33 of the right channel member 30. The fingers 62 of the left channel member 20 slide into the recesses 61 of the right channel member 30 and the fingers 60 of the right channel member 30 slide into the recesses 63 of the left channel member 20. When completely slid together, the two channel members 20, 30 form a continuous channel or track to maintain a substantially flat plane on which containers can slide without obstruction. The channel members 20, 30 can slide along one another, making the width W2 of the guide channel adjustable in order to accommodate different size refrigerator shelves.

In the exemplary embodiment as shown in FIG. 11, the storage apparatus would be assembled in essentially the same manner as described above with respect to the embodiment shown in FIGS. 1–3 and 13–15, with the exception, as noted above, with respect to the differences in certain of the sidewalls. In the exemplary embodiment as shown in FIGS. 12, the storage apparatus would be assembled in the same manner as described above with respect to the embodiment shown in FIGS. 9–10, with the exception, as noted above, with respect to the differences in certain of the sidewalls.

Figure 18:
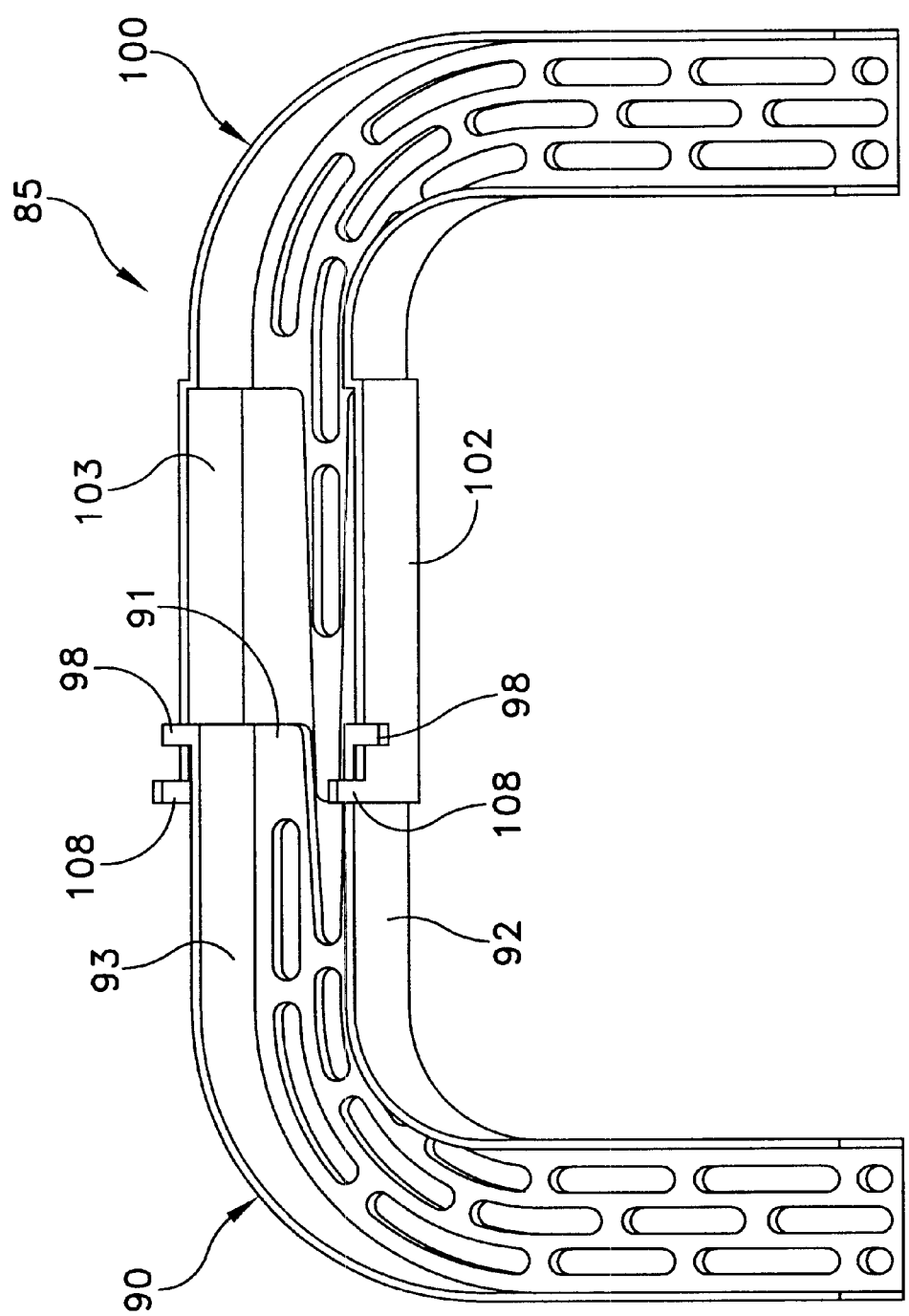
FIG. 18 is a top perspective view of the embodiment shown in FIG. 17, assembled for use in a side-by-side refrigerator compartment.
Figure 19:
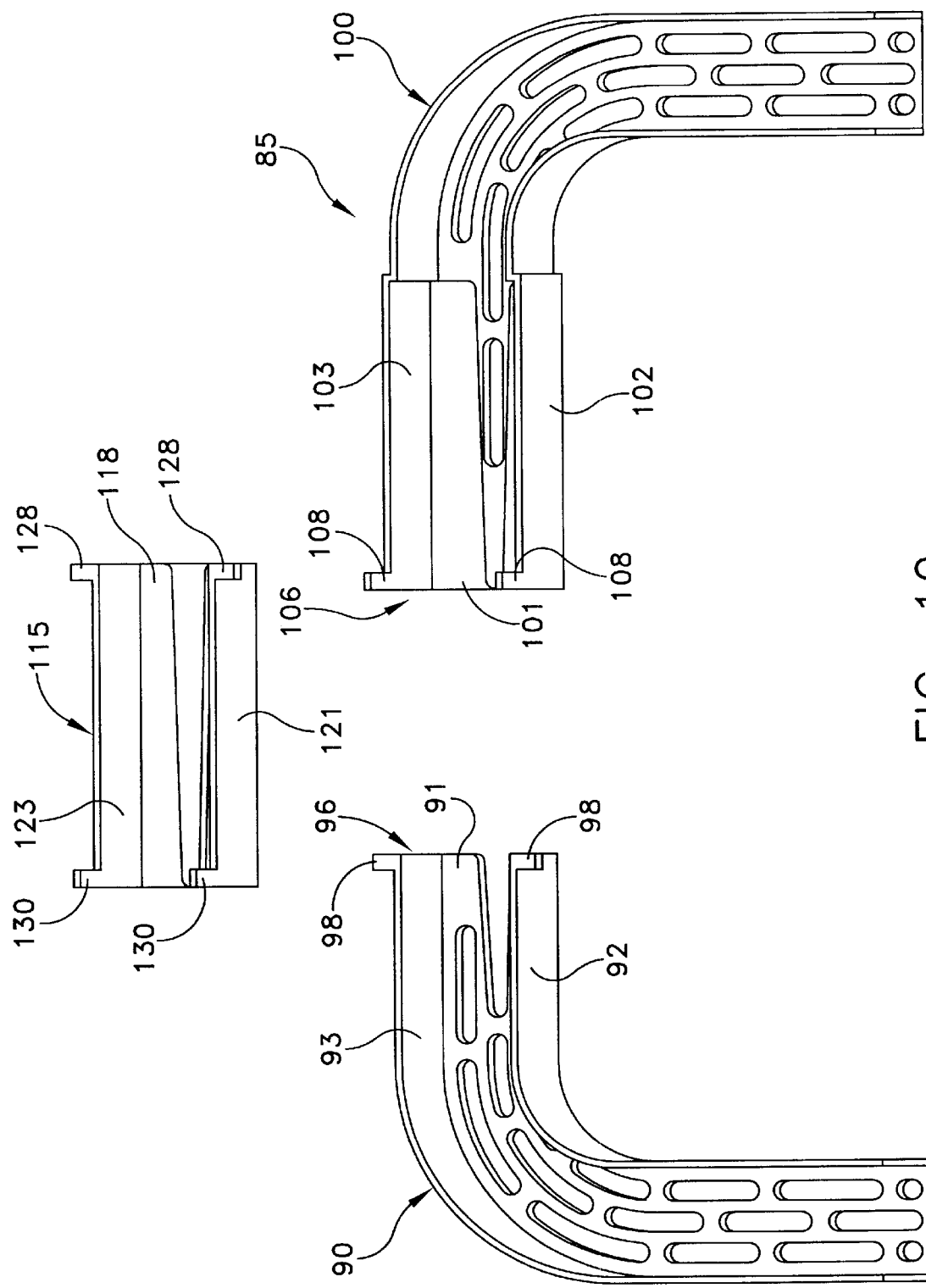
FIG. 19 is a top perspective view of the embodiment shown in FIG. 17, comprising an interlocking region insert comprising locking tabs.
Figure 20:
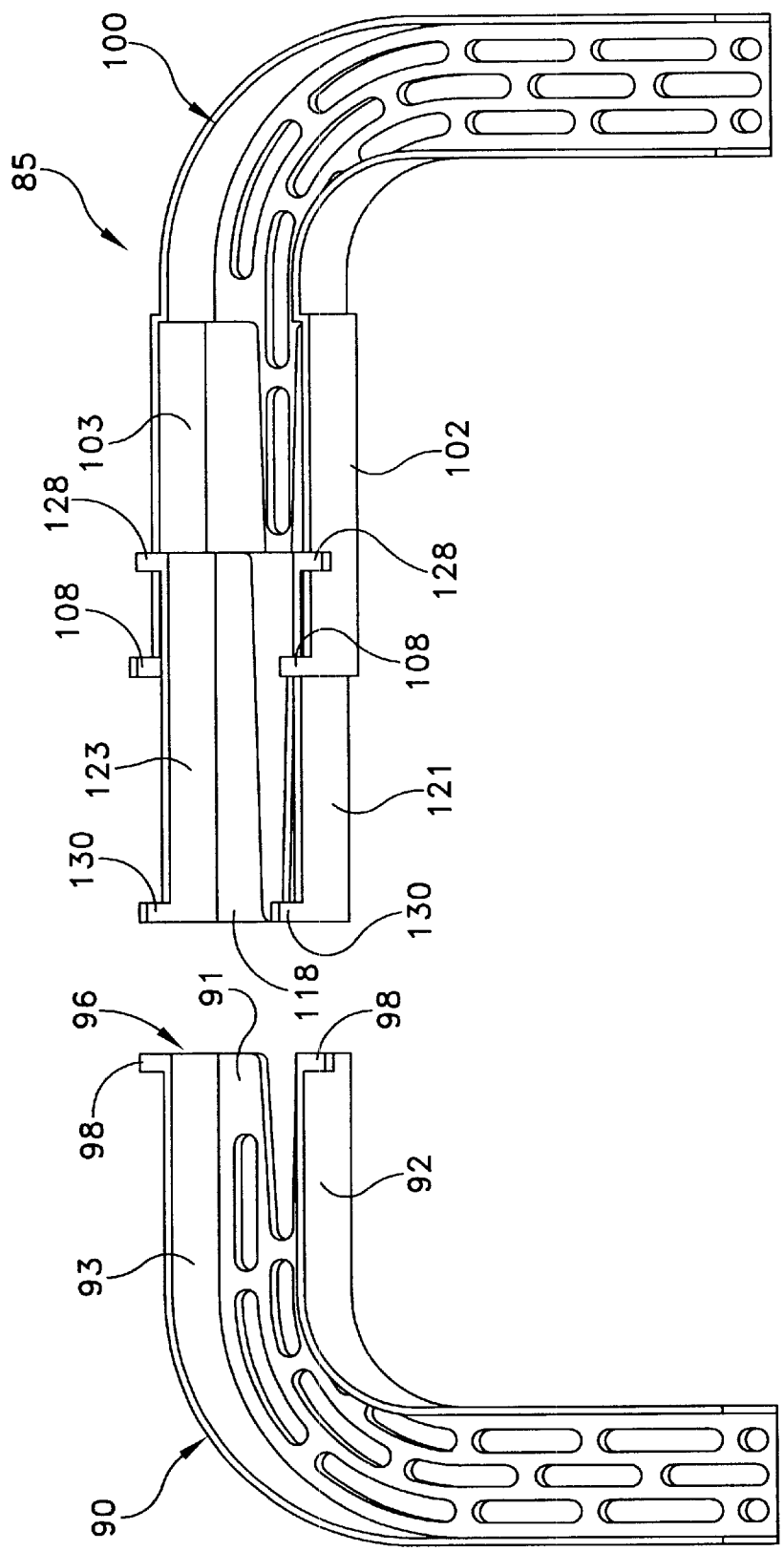
FIG. 20 is a top perspective view of the embodiment shown in FIG. 19, with the interlocking region insert assembled to the right side channel member.

In a further exemplary embodiment shown in FIGS. 17–20, a refrigerator storage guide channel 85 that is adapted for use in both side-by-side and standard refrigerators, comprises a left channel member 90, a right channel member 100, and an interlocking region insert 115 (FIG. 19). More particularly, left channel member 90 comprises a base 91, an inner sidewall 92, an outer sidewall 93 and an interlocking region 96. Interlocking region 96 includes tabs 98 positioned on the outer surfaces of inner sidewall 92 and outer sidewall 93. Tabs 98 project outwardly in substantially perpendicular relation to a top corner edge of inner sidewall 92 and outer sidewall 93, respectively. Right channel member 100 comprises a base 101, an inner sidewall 102, an outer sidewall 103, and an interlocking region 106. Interlocking region 106 includes tabs 108 positioned on the top edge corners of inner sidewall 102 and outer sidewall 103. Tabs 108 project upwardly in substantially parallel, coplanar relation to the top edge corner of inner sidewall 102 and outer sidewall 103, respectively. Referring to FIG. 19, interlocking region insert 115 comprises a base 118, an inner sidewall 121, and an outer sidewall 123. Tabs 128 project outwardly in substantially perpendicular relation to the right top corner edges of inner sidewall 102 and outer sidewall 93, respectively, and tabs 130 project upwardly in substantially parallel, coplanar relation to the left top edge corners of inner sidewall 102 and outer sidewall 103, respectively.

When a narrow version of refrigerator storage guide channel 85 is required (e.g., for fitting within a standard side-by-side refrigerator compartment) left channel member 90 is positioned within right channel member 100 in a manner substantially similar to the assembly of left and right channel members 20, 30, disclosed hereinabove (FIG. 18). In this construction, left channel member 90 and right channel member 100 are locked together by the interaction of tabs 98 and 108. More particularly, once left channel member 90 is positioned within right channel member 100, if they are pulled apart, tabs 98 will engage tabs 108 thereby preventing left channel member 90 and right channel member 100 from separating from one another.

When a wider version of refrigerator storage guide channel 85 is required (e.g., for fitting within a standard refrigerator compartment) left channel member 90 is positioned in spaced relation to right channel member 100, with interlocking region 96 positioned in confronting relation to interlocking region 106 (FIG. 19). Once in this position, interlocking region insert 115 is assembled to left channel member 90 and right channel member 100. More particularly, the right side portion of interlocking region insert 115 is positioned within right channel member 100 (FIG. 20) and left channel member 90 is positioned within the right side portion of interlocking region insert 115. In this way, refrigerator storage guide channel 85 may be selectively adjusted to fit within a variety of refrigerator compartments. In this construction, left channel member 90 and right channel member 100 are locked together, and to interlocking region insert 115, by the interaction of tabs 98 and 130, and 108 and 128. In particular, once left channel member 90 is positioned within the right side portion of interlocking region insert 115 and the right side portion of interlocking region insert 115 is positioned within right channel member 100, if they are pulled apart tabs 98 will engage tabs 130 and tabs 108 will engage tabs 128, thereby preventing left channel member 90, right channel member 100, and interlocking region insert 115 from separating from one another.

Figure 16:
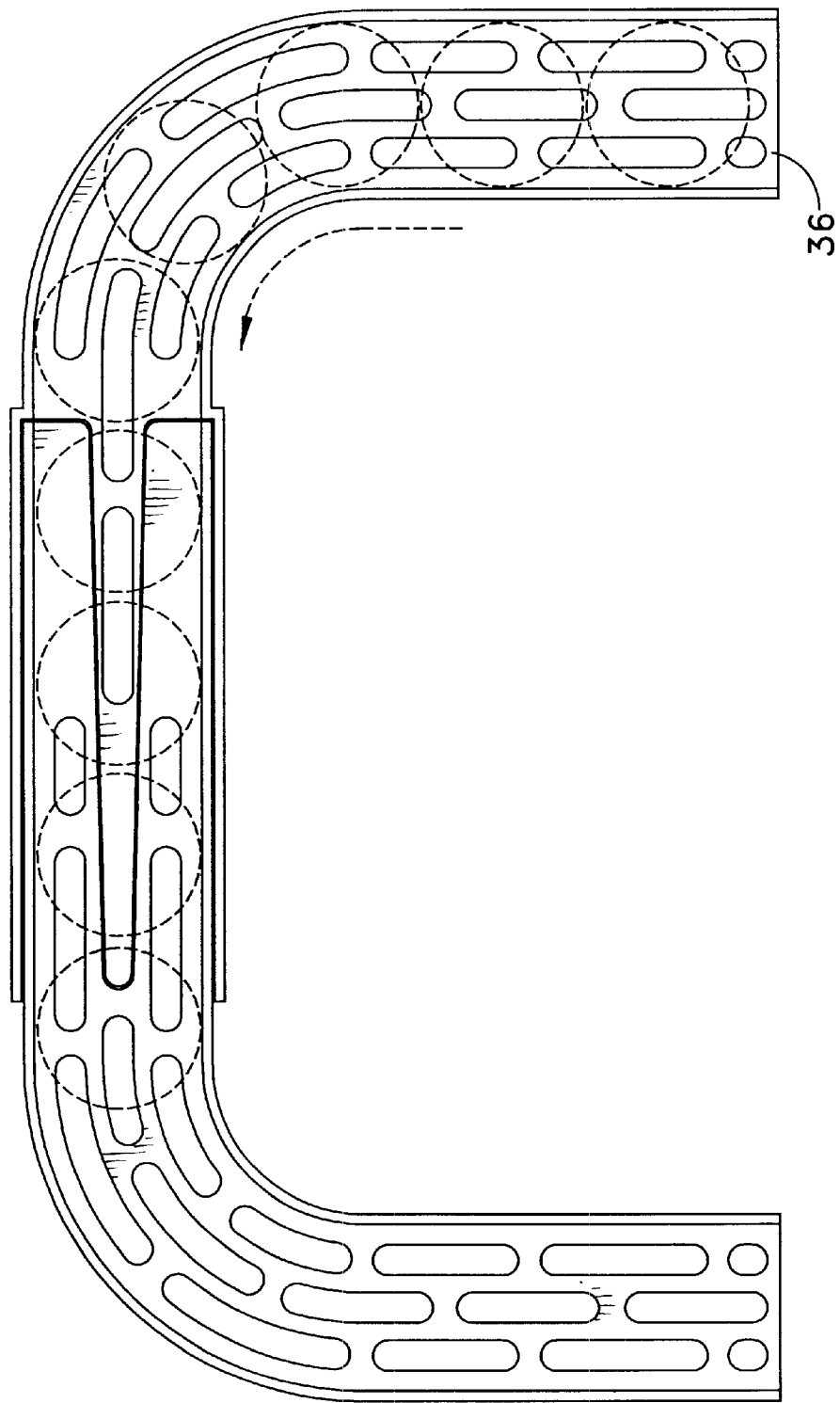
FIG. 16 is a top view of one embodiment of the invention indicating exemplary storage use.
Figure 17:
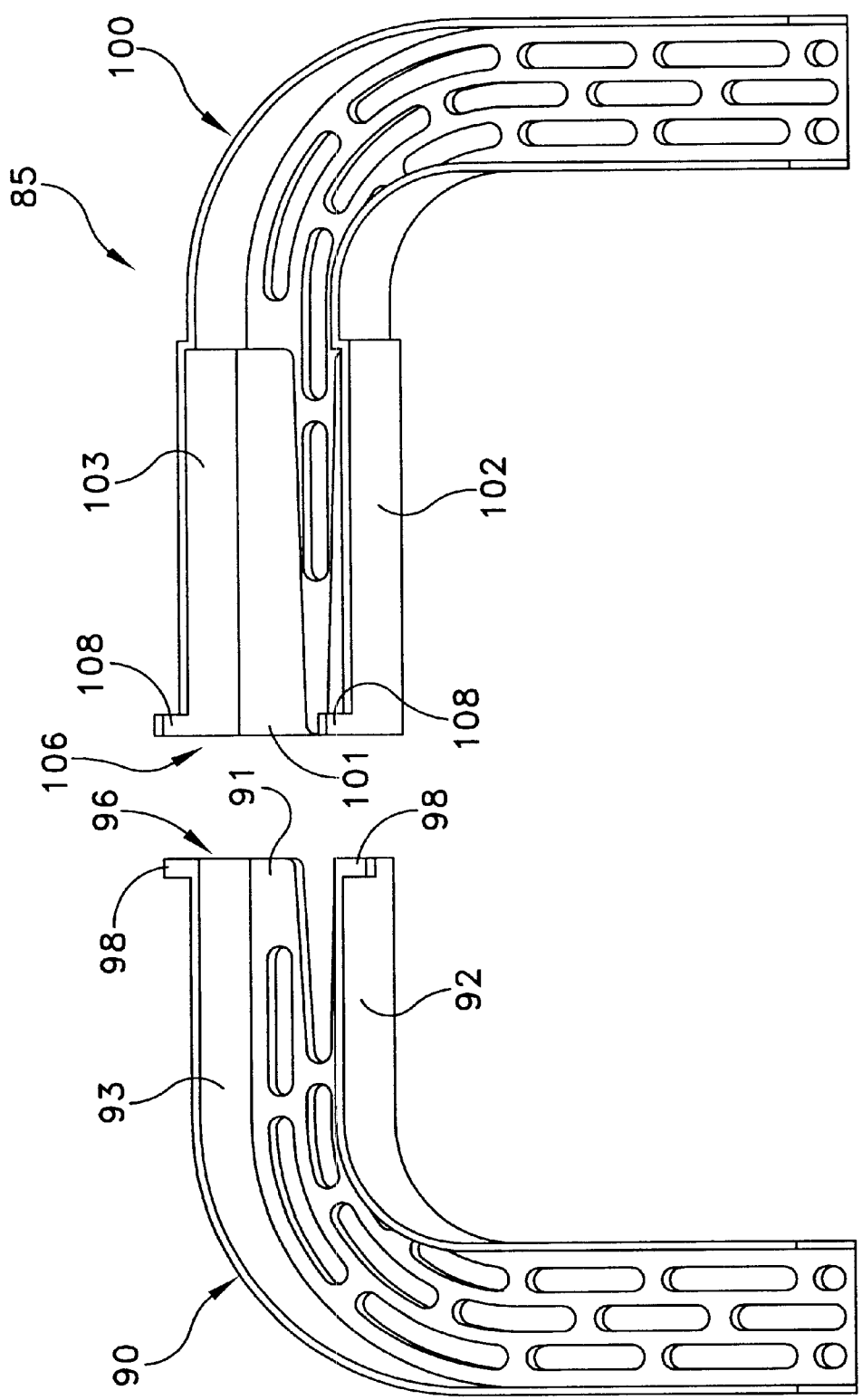
FIG. 17 is a top perspective view of another exemplary embodiment adapted for use in both side-by-side and standard refrigerator compartments comprising locking tabs.

According to certain inventive aspects, the various embodiments of the present invention are used in the following manner. The right and left channel members are assembled as described above. The assembly is placed on top of a refrigerator shelf such that the outer sidewalls 23 and 33 near the back ends 27, 37 are against the back wall of the refrigerator. The left and right channel members 20, 30 are telescoped outwardly such that the outer sidewalls 23, 33 near the front ends 26, 36 are against the sidewalls of the refrigerator. As indicated in FIG. 16, containers, such as cans and bottles, are placed into the opening at the front end 26 or 36 of one of the channel members. As more containers are added to the same end, the containers are slid towards the front end of the other channel member. Once the channel or track is filled, the containers can be retrieved as needed from one side, and replaced at the other side, so that those on one side are always cold while warm ones are being chilled at the other side.

EXAMPLE

According to one embodiment of the invention, two pieces of channel or track are "L" shaped except that the corners are curved instead of square and are approximately 2¾ inches wide at the bottom, or floor. Each piece has a sidewall approximately two inches high running along the length of each edge, and each piece is open at each end. The pieces are constructed to be placed with the floor(s) or bottom(s) flat on top of a refrigerator shelf so that one open end of one piece joins one open end of the other piece at the very back of the shelf creating a continuous track that runs down one side of the shelf from the front of the shelf to the rear of the shelf, then across the rear of the shelf to the other side and then up to the front on the other side of the shelf. The two pieces are joined at the rear in a fashion, (one piece being slightly narrower than the other), so that the end of one can telescope into the end of the other, making the sideways width of the combined channels adjustable in order to accommodate different refrigerator shelves of varying widths. Once in place, the pieces, having been joined at the rear, form a continuous track with openings at the front on both sides of the shelf. Drinks in cans or bottles are then placed onto the track, (upright), at one open end, one at a time, and by pushing gently each time, the channel becomes filled and the drinks which were loaded first, will appear at the opposite end. Once the track is filled, drinks can be retrieved as needed from one side, and replaced at the other side, so that those on one side are always cold, while warm ones are being chilled at the other side.

The two pieces of track or channel include a base or bottom, which is wide enough to accommodate the diameter of the beverage container for which it is used, in this case, approximately two and three quarter inches which would accommodate many twelve ounce or sixteen ounce individual drink cans and/or bottles.

The base, or bottom, or floor has multiple slots which run along it's entire length and breadth, and parallel to it's edges, the purpose of which is to reduce the friction caused by cans or bottles, being pushed or slid on the top of the base, or bottom, or floor.

The two pieces of track or channel include two sidewalls, each being approximately two inches high at it's highest point, which sidewalls run, one along each edge of the length of, and upwardly perpendicular to the base or bottom or floor.

The base or bottom or floor of one piece, contains a long angular raised section which can be called a tongue, and which is constructed at the end of the piece where it will meet the other piece, and in which the base or bottom or floor of the other piece contains a recessed section of the same size and shape which can be called a slot so that when the end of one piece is place into the end of the other piece to form a continuous channel or track, the tongue of one piece fitting into the slot of the other piece maintain a flat plane on which cans or bottles of drinks can slide without obstruction.

The sidewalls are constructed to be high enough, (in this instance approximately two inches high), to force cans or bottles, which are being pushed along the base or bottom or floor, to follow the path of the base or bottom or floor along the side(s) and back of the refrigerator shelf.

Each sidewall is constructed so as to be sloped at the front or open end of the base or bottom or floor so as to minimize any obstacle to loading or retrieving cans or bottles of drinks.

The base or bottom of the piece which contains the angular elevation called the tongue, is widened along the length of said tongue so as to receive the end of the narrower piece containing the slot in which the tongue fits, so that the sidewalls of the narrower piece fit inside the sidewalls of the widened piece.

The base or bottom of the piece which contains the angular shaped slot, into which the tongue from the opposite piece tits, is slightly raised so as to fit on top of the base or bottom of the opposing piece when joined, so that the base or bottom of the piece containing the slot rests on top of the base or bottom of the piece containing the tongue, and so that both pieces form a uniform plane when joined.

Although the invention has been described in terms of exemplary embodiments, it is not limited thereto. Rather, the appended claims should be construed broadly, to include other variants and embodiments of the invention which may be made by those skilled in the art without departing form the scope and range of equivalents of the invention. For example, the interlocking regions of the left and right channel members may be reversed such that interlocking region of the left channel member contains the tongue and the right channel member contains the tongue-shaped recess. Likewise, either channel member may have a broader base at the interlocking region for allowance of insertion of the sidewalls of the other channel member.

What is claimed is:

1. A refrigerator storage guide channel comprising two channel members, a left channel member and a right channel member, said channel members comprising a base, sidewalls, and interlocking means, said interlocking means located in an interlocking region, and said channel members joined by said interlocking means;

said interlocking means including a tongue on the base of one of said channel members and a tongue-shaped slot on the base of the other of said channel members, said tongue fitting into said tongue-shaped slot, and the sidewalls in the interlocking region of one of said channel members fitting within the sidewalls in the interlocking region of the other of said channel members;

wherein the base in the interlocking region of said channel member having said tongue is recessed relative to the tongue and remainder of said base, and wherein said base in the interlocking region of the other channel member fits on top of said recessed base, and wherein a top surface of said guide channel is planar where the channel members meet.

2. The guide channel of claim 1, wherein said channel members are slidably received by each other via said interlocking means.

3. The guide channel of claim 1, wherein said interlocking means of said channel members includes a plurality of finger-like projections and a plurality of recesses in said interlocking region, and wherein said finger-like projections on said left channel member fit within the recesses of said right channel member, and wherein said finger-like projections on said right channel member fit within the recesses of said left channel member, and wherein the sidewalls in the interlocking region of one of said channel members fits within the sidewalls in the interlocking region of the other of said channel members.

4. The guide channel of claim 1, wherein said channel members are substantially L-shaped.

5. The guide channel of claim 1, further including friction reducing means.

6. The guide channel of claim 5, wherein said friction reducing means is a plurality of slots located on said base of said channel members.

7. The guide channel of claim 5, wherein said friction reducing means is a plurality of raised elongated bumps located on said base of said channel members.

8. The guide channel of claim 5, wherein said friction reducing means is a plurality of raised ridges running continuously the length of said base and parallel to said sidewalls of said channel members.

9. The guide channel of claim 1, wherein said sidewalls of said channel members are sloped at a front end of each of said channel members.

10. The guide channel of claim 1, wherein said sidewalls of said channel members are approximately two inches in height.

11. The guide channel of claim 1, wherein said base of said channel members is approximately two and three-quarter inches in width.

12. A refrigerator storage apparatus comprising two or more guide channels, said guide channels each comprising a left channel member and a right channel member, said left and right channel members having a base, sidewalls and interlocking means, and wherein said interlocking means is located in an interlocking region, and wherein said left and right channel members are connected by said interlocking means; and wherein said guide channels are of decreasing width with a narrower guide channel fitting within and against an inner edge of a wider guide channel.

13. The storage apparatus of claim 12, wherein said left channel members are permanently attached to one another and said right channel members are permanently attached to one another.

14. The storage apparatus of claim 12, wherein said left channel members are detachably mounted to one another and said right channel members are detachably mounted to one another.

15. A refrigerator storage guide channel comprising:

a first channel member including a base, sidewalls, and interlocking means located on said sidewalls;

a second channel member including a base, sidewalls, and interlocking means located on said sidewalls; and an insert member including a base, sidewalls, and interlocking means located on said sidewalls; wherein said first and second channel members are slidingly joined together by said insert member and said interlocking means maintain said first and second channel members and said insert member in engaged relation to one another.

16. A refrigerator storage guide channel according to claim 15 wherein said interlocking means comprise tabs positioned on corner portions of said sidewalls.

17. A refrigerator storage guide channel according to claim 16 wherein said sidewalls each comprise at least one tab oriented substantially perpendicular to said sidewall and at least one tab oriented substantially parallel to said sidewall.

18. A refrigerator storage guide channel comprising:

a first channel member including a base, sidewalls, and at least one tab oriented substantially perpendicular to one of said sidewalls and at least one tab oriented substantially parallel to one of said sidewalls, wherein said tabs are located on corner portions of said sidewalls;

a second channel member including a base, sidewalls, and at least one tab oriented substantially perpendicular to one of said sidewalls and at least one tab oriented substantially parallel to one of said sidewalls, wherein said tabs are located on corner portions of said sidewalls; and an insert member including a base, sidewalls, and at least one tab oriented substantially perpendicular to one of said sidewalls and at least one tab oriented substantially parallel to one of said sidewalls, wherein said tabs are located on corner portions of said sidewalls, and further wherein said first and second channel members are slidingly joined together by said insert member and said tabs maintain said first and second channel members and said insert member in engaged relation to one another.

* * * * *